US007372425B2

(12) United States Patent
Cortambert

(10) Patent No.: US 7,372,425 B2
(45) Date of Patent: May 13, 2008

(54) CRUCIFORM ANTENNA COMPRISING LINEAR SUB-ANTENNAS AND ASSOCIATED PROCESSING

(75) Inventor: Jean-Marc Cortambert, Toulon (FR)

(73) Assignee: Office National d'Etudes et de Recherches Aerospatiales (FR)

( * ) Notice: Subject to any disclaimer, the term of this patent is extended or adjusted under 35 U.S.C. 154(b) by 141 days.

(21) Appl. No.: 10/579,582

(22) PCT Filed: Nov. 16, 2004

(86) PCT No.: PCT/FR2004/002925

§ 371 (c)(1),
(2), (4) Date: May 17, 2006

(87) PCT Pub. No.: WO2005/050786

PCT Pub. Date: Jun. 2, 2005

(65) Prior Publication Data

US 2007/0063912 A1 Mar. 22, 2007

(30) Foreign Application Priority Data

Nov. 17, 2003 (FR) .................................. 03 13418

(51) Int. Cl.
*H01Q 21/08* (2006.01)
*G01S 7/28* (2006.01)

(52) U.S. Cl. ...................................... 343/824; 342/175

(58) Field of Classification Search ................ 343/824; 342/175, 59, 81, 131–135, 157, 368–375
See application file for complete search history.

(56) References Cited

U.S. PATENT DOCUMENTS

| | | | | |
|---|---|---|---|---|
| 3,683,374 | A | 8/1972 | Honold | |
| 4,864,309 | A | 9/1989 | Wiley et al. | |
| 5,341,142 | A * | 8/1994 | Reis et al. | 342/64 |
| 5,621,325 | A | 4/1997 | Draper et al. | |
| 5,828,334 | A | 10/1998 | Deegan | |
| 2007/0063912 | A1* | 3/2007 | Cortambert | 343/824 |

FOREIGN PATENT DOCUMENTS

| | | | |
|---|---|---|---|
| EP | 0158690 | A | 10/1985 |
| EP | 790506 | A1 * | 8/1997 |
| EP | 0928042 | A | 7/1999 |
| FR | 2885736 | A1 * | 11/2006 |

OTHER PUBLICATIONS

Int'l. Search Report May 10, 2005.

* cited by examiner

*Primary Examiner*—John B Sotomayor
(74) *Attorney, Agent, or Firm*—Wolf Block LLP

(57) ABSTRACT

The invention relates to a cross antenna comprising linear sub-antennas and to the associated processing. More specifically, the invention relates to an antenna (1) comprising: first (2) and second (3) linear sub-antennas which are equipped with sensors (21-2M, 31-3N) forming first and second line segments and generating a basic signal (Si', Gj'), the angle between the respective directional vectors of the first and second tangents to the midpoint respectively of the first and second line segments being between 30° and 150°; an antenna processing device (4, 5) forming combined signals (VSi, VGj); a signal-processing device (6, 7) generating combined useful signals (TSi, TGj); a device (8) for calculating the correlation coefficients ([Cij]) between the combined useful signals; and a device (8) for generating a detection signal ([Rij]) when a correlation coefficient exceeds a threshold. The invention can be used, for example, to obtain an antenna having fewer sensors for an equivalent performance level.

13 Claims, 7 Drawing Sheets

D1

D2

D3

CRUCIFORM ANTENNA COMPRISING LINEAR SUB-ANTENNAS AND ASSOCIATED PROCESSING

This application claims benefit of priority to International Application PCT/FR2004/002925 filed on Nov. 16, 2004, which claims the benefit of French Application 0313418 filed on Nov. 17, 2003.

BACKGROUND OF THE INVENTION

This invention relates in general to antennas, and in particular to the antenna structure and the architecture of the processing of data from sensors of such antennas when they are used for reception.

It is known in the field of radar to use surface antennas with beam-forming by calculation, intended to detect, locate and classify targets or sources. Such an antenna generally consists of an array including up to several thousand sensors arranged so as to form a rectangular planar surface. These sensors generally have an identical directivity pattern. This basic directivity pattern does not have a sufficient resolution for the performance required from the antenna in location. A beam-forming device produces a combination (for example, a linear combination) of signals generated by the sensors so as to form the required elevation angle and bearing directivities.

Such an antenna has disadvantages. For a given precision of the location in terms of elevation angle and bearing, this antenna is very expensive and difficult to integrate on a stationary or mobile platform, such as a naval platform, an aircraft, a land vehicle or a spacecraft.

SUMMARY OF THE INVENTION

Therefore, an antenna solving one or more of these disadvantages is needed. The invention therefore relates to an antenna including:

- a first and a second linear sub-antenna:
  - each having a plurality of sensors arranged so as to form first and second line portions, respectively, with each sensor generating a basic signal;
  - wherein the angle between the respective directional vectors of the first and second tangents to the midpoint respectively of the first and second line portions is between 30° and 150°;
- an antenna processing device forming a plurality of combined signals for each line portion, which signal is a combination of basic signals of the sensors of this line portion;
- a signal processing device generating combined signals useful for filtering the noise of the combined signals coming from each line portion;
- a device for calculating the correlation coefficients between the useful combined signals of the first line portion and the useful combined signals of the second line portion;
- a device generating a detection signal when a correlation coefficient exceeds a predetermined threshold.

According to an alternative, the antenna also includes a target detection device, comparing each calculated correlation coefficient with a predefined associated threshold, detecting and locating a target when a correlation coefficient exceeds the associated threshold.

According to another alternative, the antenna includes a device for processing the detection signal and the correlation coefficients generating information concerning the target detected. According to another alternative, the information generated includes the distance, the elevation, the bearing and the speed of the target. The antenna can also include a device displaying the information generated.

According to another alternative, each sensor includes a plurality of elementary sensors selected from the group consisting of radar, radioelectric and electromagnetic sensors, hydrophones, transducers, microphones, ultrasound sensors, accelerometers, and optical and infrared sensors.

It is possible for the elementary sensors to be transmissive and for the data processing device to process the combined signals according to the signal transmitted by each sensor, which processing includes, for example, a pulse compression.

According to an alternative, the antenna also includes a transmitter, and the data processing device processes the combined signals according to the signal transmitted by the transmitter, which processing includes, for example a pulse compression.

According to yet another alternative, the first and second line portions are curves without an inflection point. It is possible for the first and second line portions to be straight and oriented respectively in elevation angle and in bearing. These straight line portions are preferably not parallel.

Other special features and advantages of the invention will become clearer from the following description given by way of a non-limiting example, with regard to the figures.

DETAILED DESCRIPTION OF THE INVENTION

The term sensor hereinafter refers to a device including one or more elementary sensors. A sensor having a plurality of elementary sensors generates a basic signal based on the elementary sensor signals in a manner known per se.

To improve the performance of a sensor, it is commonplace to use a module combining a plurality of sensors. The term sensor used in this document also covers a module of sensors, because a sensor and a module of sensors are functionally identical for the antenna processing.

The term antenna processing hereinafter refers to the processing of signal of sensors, which forms, by combining the sensor signals, signals called channels or beams, which favour a direction of travel in the space of the physical quantity. The signal combinations mentioned below will be, for example, linear combinations of these signals.

The invention proposes an antenna including at least two linear sub-antennas, each equipped with sensors forming a line portion. The two line portions are defined as follows: tangents to the midpoint of each line portion are formed. The angle between directional vectors of these tangents must then be between 30° and 150°. The orientations of the line portions are thus distinct enough for the antenna to recover sufficient information along two distinct axes considered to be orthogonal. Each of the linear sub-antennas has an antenna processing device that generates one or more combined signals. Each of the linear sub-antennas has a signal processing device applied to the combined signals, which provides one or more useful combined signals. These useful combined signals are the results of the processing of the combined signals, intended to extract the noise therefrom, and are generated before the correlation processing. The antenna also has a device for calculating the correlation coefficients between the useful combined signals of one linear sub-antenna with the useful combined signals of the other linear sub-antenna. The resolution information is obtained by calculation rather than by increasing the number of sensors.

A simplified example of an antenna will be described in reference to FIG. 1. The antenna of FIG. 1 includes two linear sub-antennas 2 and 3. The linear sub-antennas 2 and 3 each include a plurality of sensors, respectively 21 to 2M and 31 to 3N. Sensors 21 to 2M are arranged so as to substantially form a first line portion. Sensors 31 to 3N are arranged so as to substantially form a second line portion.

Figure 1:
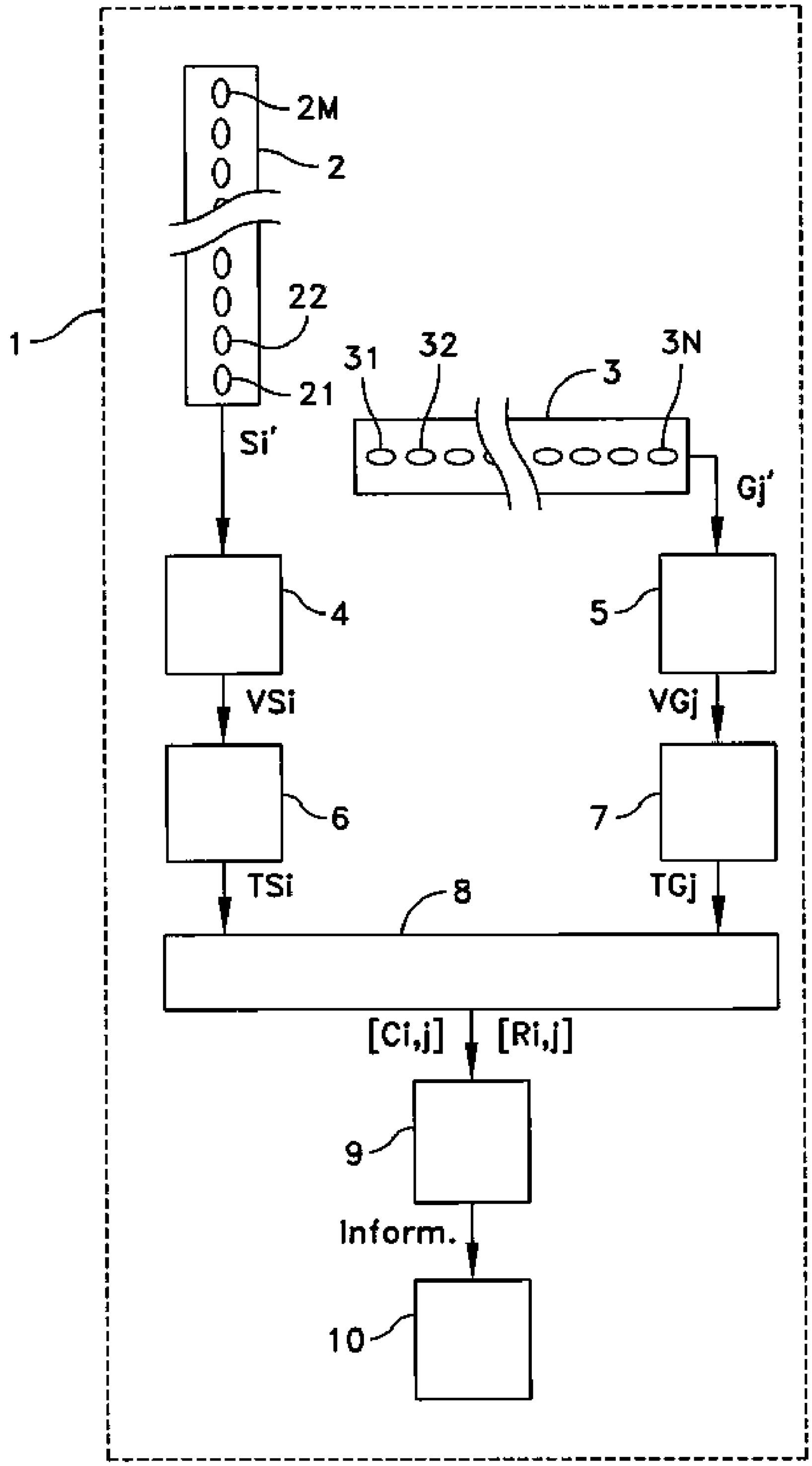
FIG. 1, a diagrammatic representation of an example of antenna structure and architecture for processing data from sensors of such antennas according to the invention.

The first and second line portions of FIG. 1 verify the orientation condition defined previously these line portions are in this case straight segments placed in the same plane and are orthogonal. The angle between the directional vectors can be in an appropriate range selected by a person skilled in the art. It is also possible for this angle to be in the following ranges: [40°; 140°], [50°; 130°], [60°; 120°], [70°; 110°], [80°; 100°], [85°; 95°], or [89°; 91°]. Sensors 21 to 2M are in this case used to determine the elevation angle of a source or a target, while sensors 31 to 3N are used to determine the bearing thereof.

These sensors include one or more elementary sensors not shown, of the appropriate type. A sensor having one or more elementary sensors generates a basic signal based on elementary sensor signals in a manner that is known per se. Each sensor therefore generates a basic signal that can undergo a particular signal processing operation before the antenna processing. The sensors of a line portion can have an identical directivity and be equally distributed on this line portion. Sensors 21 to 2M respectively generate basic signals S1 to SM illustrated by Si'. Sensors 31 to 3N respectively generate basic signals G1 to GN illustrated by Gj'. The symbol i' will hereinafter be used to designate all of the signals or numbers associated with a sensor 2*i*'. Thus, signal S4 is associated with sensor 24. Similarly, the symbol j' will be used to designate all of the signals or numbers associated with a sensor 3*j*'. Thus, signal G2 is associated with sensor 32.

An antenna processing device 4 forms a combined signal of the sensors of a line portion, in a manner that is known per se. The antenna processing device 4 thus generates the combined signals VSi associated with the signals Si'. An antenna processing device 5 forms a combined signal of the sensors of the other line portion, in a manner that is known per se. The antenna processing device 5 thus generates the combined signals VGj associated with the signals Gj'. The combined signals are intended, inter alia, to form directivity lobes of the antenna used for reception.

Each of the linear sub-antennas has a signal processing device processing signals coming from the antenna processing. This signal processing device provides one or more useful combined signals at the output of each linear sub-antenna.

The signal processing devices 6 and 7 extract the useful signal from the noise, in a manner that is known per se. Devices 6 and 7 thus respectively process the combined signals VSi and VGj in order to generate useful combined signals TSi and TGj. Signal processing devices 6 and 7 can also be coupled to the transmission device of the antenna if it is of the transmitting/receiving type or of another antenna if the antenna is only of the receiving type, so as to perform a processing operation taking into account the signals transmitted in a manner that is known per se, such as pulse compression.

The calculation device 8 calculates the time or frequency correlation coefficients (depending on whether the processing was performed in the time or the frequency domain) between the useful combined signals TSi of the first line portion and the useful combined signals TGj of the second line portion. Thus, the matrix [Cij] of correlation coefficients is thus formed. Details regarding the calculation of these coefficients will be provided below. The calculation device 8 also uses correlation coefficients [Cij] to detect a target and generate a detection signal. A possible operation is as follows: a detection device (included in the calculation device 8 in the example) compares each correlation coefficient with a respective predefined threshold. When a given correlation coefficient is below its predefined threshold, it is considered that there is no source or target located at the intersection of the two directivity lobes VSi and VGj, in the elevation angle i and the bearing j. When a correlation coefficient exceeds its predefined threshold, however, it is considered that a source or target is located at the intersection of the two directivity lobes VSi and VGj, in the elevation angle i and the bearing j. A detection signal associated with the result of the comparison can thus be generated in the form of a binary value. All of the signals can then be arranged in a matrix [Rij]. The threshold is defined according to the desired performance of the antenna and the associated data processing device (including the antenna processing, the signal processing and the information processing), in terms of probability of detection and false alarms.

In the case of antenna processing operations known to a person skilled in the art, if the antenna of FIG. 1 is of the transmission/reception type, the directivity diagram at the transmission of the antenna is that of a lobe in the form of a cross, and, by reciprocity, the directivity diagram at the reception is the same as at the transmission. With the antenna structure presented, the association of the antenna and signal processing operations makes it possible to obtain the same information as that obtained by a surface antenna, for example, a planar antenna, of which the directivity lobe at the reception would be as thin as the centre of the cross formed by the directivity lobe. In addition, also in the case of antenna processing operations known to a person skilled in the art, if the antenna of FIG. 1 does not perform the correlation processing between the signals coming from the linear sub-antennas, the detection performance is equivalent to that of sub-antennas alone. This performance is clearly inferior to that obtained by the antenna of the invention.

The processing device 9 can perform additional information processing steps, in order to improve, for example, the performance with regard to the probability of false alarms or in order to determine the speed, the distance of a target or any other useful information. The processing device 9 is thus intended to enable the information to be processed by an operator or a processing device. This device 9 receives, at the input, data such as the matrix [Cij], the matrix [Rij] or any similar data. All of the information determined can be provided to the users by an appropriate display device 10, which is known per se.

FIGS. 5 to 14 show various shapes of line portions of linear sub-antennas that can be used in the context of the invention.

Figure 5:
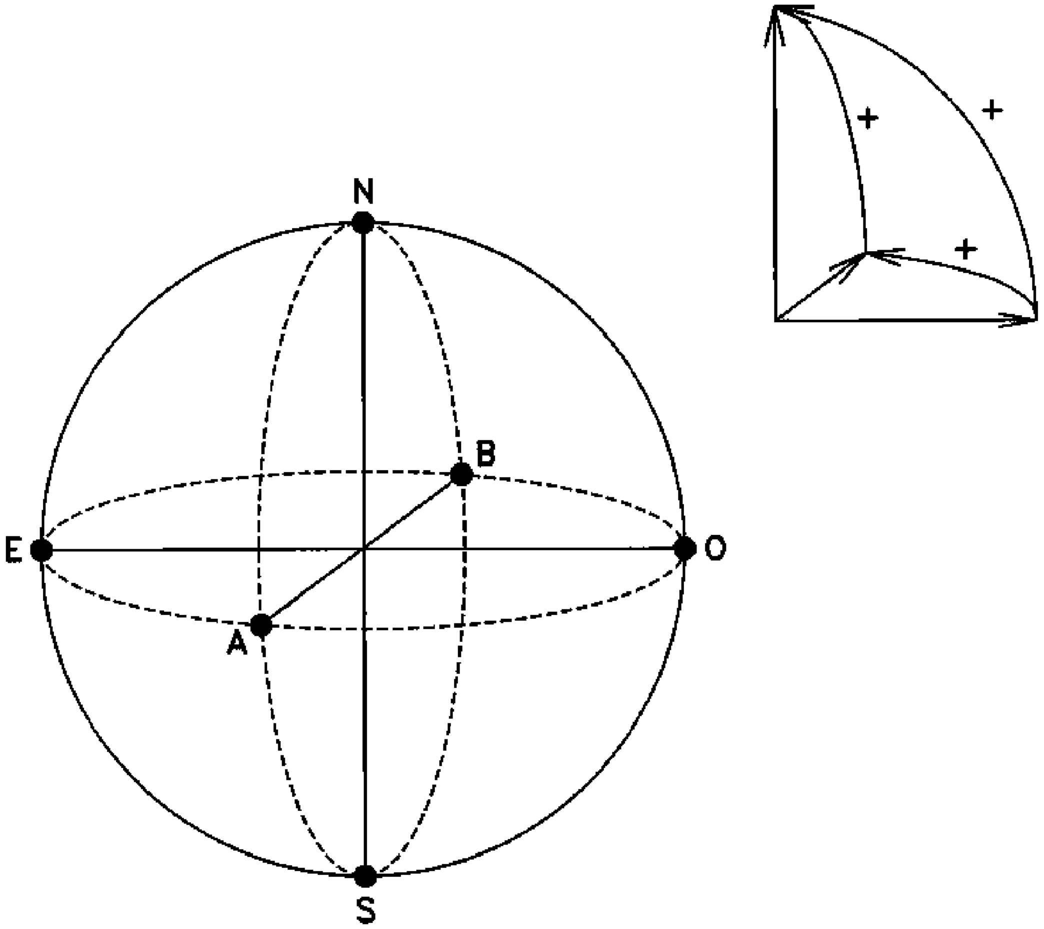
FIGS. 5 to 14, several diagrams showing examples of linear sub-antenna structures.

FIG. 5 shows a sphere with sensors arranged on its surface. The line portions of the sensors of a linear sub-antenna are selectively formed by the arcs of these circles of sensors. The circles and circle arcs will be designated by points belonging to them. The sphere of FIG. 5 thus has the circles of sensors EAOB, ASBN and ESON. The processing operations detailed above can be performed on different pairs of line portions. The pairs of line portions of the cross antenna can be: EAO with NAS; OBE with SBN; SON with AOB; NES with BEA; ONE with BNA; ESO with ASB; or the same pairs with sub-portions of these line portions, such as, for example, EAO with NA, or a line portion formed by a point of the EA segment and a point of the AO segment with a line portion formed by a point of the NA segment and a point of the AS segment, and so on.

The line portions formed by the sensors of the linear sub-antennas can thus be oriented along orthogonal geodesic lines of the surface. When a line portion has a closed curve form, it will be divided into sub-portions so as to define line portions having a directivity equivalent to that of a rectilinear line portion; the midpoint of the line portion will be determined as a point at the level of which the distance with respect to the line portion of the other linear sub-antenna is the shortest.

Figure 6:
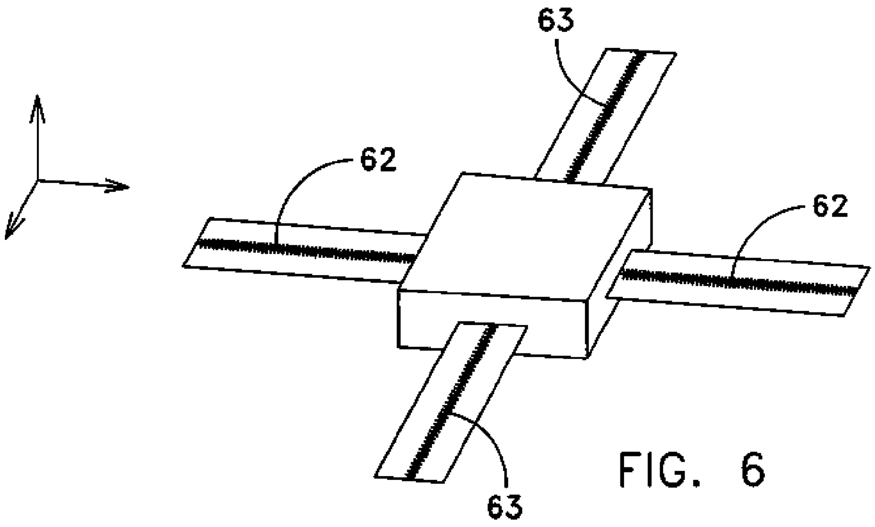

FIG. 6 shows a satellite having linear sub-antennas 62 and 63 arranged on solar panels oriented in two orthogonal directions.

Figure 7:
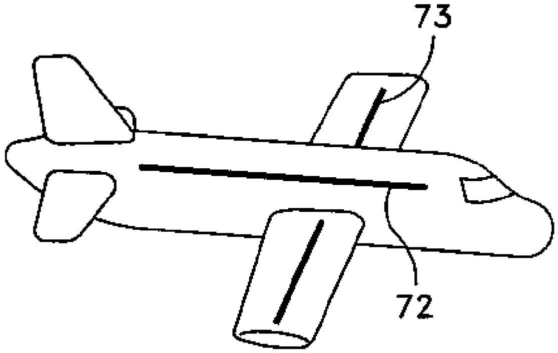

FIG. 7 shows an airplane having line portions 73 formed by the sensors of linear sub-antennas, arranged respectively transversely on or under the wings, and a line portion 72 formed by sensors arranged respectively axially on or under the body.

Figure 8:
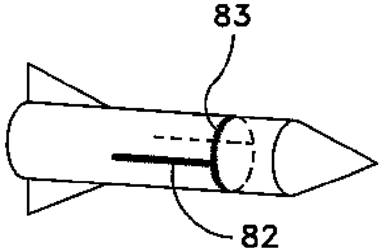

FIG. 8 shows a missile having line portions 82 arranged axially on the body, and a circular line portion 83 surrounding a cross-section of the body.

Figure 9:
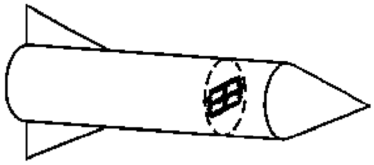

FIG. 9 shows another missile in which multiple line portions are arranged in a cross-section of the missile.

Figure 10:
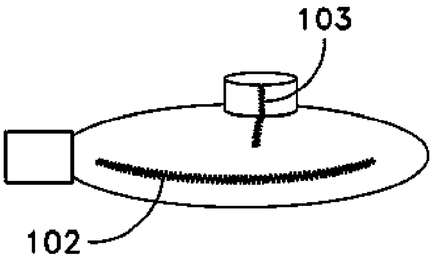

FIG. 10 shows line portions of linear sub-antennas suitable for a submarine. Line portion 102 extends axially at the surface of the shell. Line portion 103 extends transversely between the sail and the shell.

Figure 11:
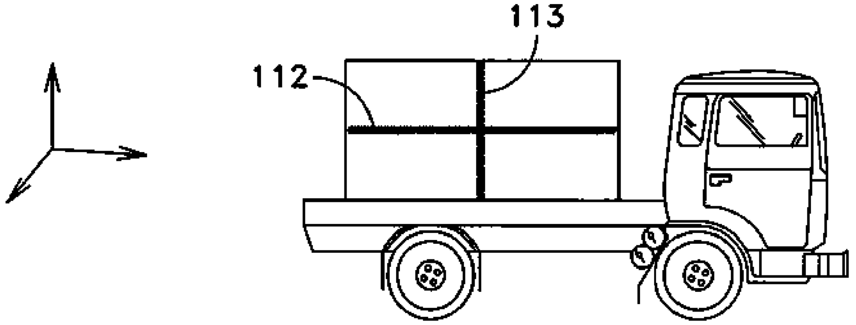

FIG. 11 shows a vehicle having a platform supporting two orthogonal line portions 112 and 113.

Figure 12:
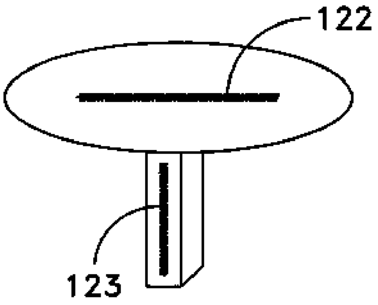

FIG. 12 shows an antenna rotating about its vertical axis. A rectilinear line portion 123 extends over the axis of the antenna mount. A rectilinear line portion 122 extends over the upper portion of the antenna.

Figure 13:
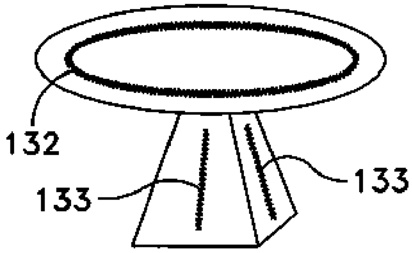

FIG. 13 shows a stationary antenna. Rectilinear line portions 133 extend respectively over a plurality of surfaces of the mount. A circular line portion 132 extends over the upper portion of the antenna.

Figure 14:
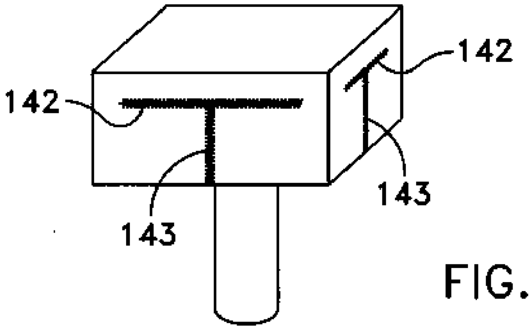

FIG. 14 also shows a stationary antenna. The upper portion has a rectangular parallelepiped shape. Each side surface has a vertical rectilinear line portion 143 and a horizontal rectilinear line portion 142.

It is possible to use various limitations regarding the form of the line portions. In particular, it is possible for at least one line portion to have a curved form. It is possible for such a curve not to have an inflection point. It is also possible for the variation in curvature to be limited.

It is thus possible to limit the curvature near the midpoint of the line portion. The length of the line portion L and the curvilinear distance d between a point and the midpoint of the line portion are defined. For any point such as $d/L<0.1$, it is possible for the angle between a directional vector of the tangent at this point and a directional vector of the tangent to the midpoint not to be included in the range [45°; 135°].

It is possible for a line portion to be conformal, i.e. for it to have a form matching the non-rectilinear form of its support, and for a processing of the signals of the modules to make this line portion equivalent to a rectilinear line portion. It is in particular possible to apply such a processing operation to a line portion attached to the surface of the keelson, a wing or a tail unit of an airplane. The processing of conformal antennas is a technique known to a person skilled in the art.

The two line portions can be separated by any distance on the condition that the target or the source is in the far field of the two sub-antennas, which is defined by a person skilled in the art for each sub-antenna as the ratio of the square of the rectilinear length of the antenna to the lowest wavelength used by the antenna.

The two line portions can be arranged at a sufficient distance separating them so that a coupling between their sensors would be weak. However, the two line portions can be secants; there can be:

- one sensor common to the two line portions: this means that the correlation coefficient for this sensor is reduced to its autocorrelation coefficient;
- a hole in one of the two line portions: this case corresponds to gap antennas, which are known per se to a person skilled in the art.

Although only these types of antennas have been shown in the various figures, it is also possible to apply an antenna having a sensor array, for example with a rectangular shape, to the invention. The array is then divided into portions of sub-antennas as defined above. It is possible in particular to define a plurality of lines and columns and to calculate the correlation coefficients for a plurality of line-column pairs. It is also possible to consider more than two sub-antenna portions having orientations as defined above and not forming an array, and to calculate correlation coefficients for a plurality of pairs of these sub-antenna portions. The calculations of the correlation coefficients for various pairs can be crossed to enhance the performance of the antenna.

In a sonar application, a passive antenna, of which the sensors are hydrophones, or an active antenna, of which the sensors are transducers, can be used. The processing device forming the combined signal in particular performs a channel-forming function.

In an application of the antenna to a radar, an antenna is used for reception and the sensors of the modules are suitable for detecting radar signals. The processing device forming the combined signal in particular performs a beam-forming function.

To perform the calculation of the time correlation coefficient of complex video signals (for example, TSi and TGj in the example of FIG. 1), particularly suitable for a radar application, the coefficients of [Cij] can be calculated as follows:

Let X(t) and Y(t) be complex, random, non-periodic, centred and stationary signals of the second order. The correlation function of the two signals is defined as the mathematical expectation of the product of X(t) by the conjugated complex of $Y(t-\tau)$, $\tau$ being the time shift between the two signals.

$$\text{correlation}_{XY}(\tau)=E[X(t)Y^*(t-\tau)]=\int_{\Omega}X(t,\omega)Y^*(t-\tau,\omega)\,dP(\omega)$$

In the case of ergodic signals, the correlation function verifies the following equation:

The time shift $\tau_0$ is determined by the shape of the antenna. In the case of two identical linear sub-antennas that are secants at their centre, the maximum $C_{XY}$ is reached for $\tau_0=0$.

The maximum correlation coefficients Cij are obtained by replacing the random signals X(t) and Y(t) with the useful combined signals as defined above TSi and TGj. The correlation coefficients Cij therefore form a matrix [Cij] of which the values are between 0 and 1.

A maximum correlation coefficient value Cij above a predefined correlation threshold means that at least one source or one target is detected at the virtual intersection of the directivity lobes of the two linear sub-antennas 2*i* and 3*j*. In the case of FIG. 1, the presence of a source or target is determined at the intersection of the elevation angle i and the bearing j.

Another calculation method, based on the use of real combined signals, makes it possible to simplify the calculation step. The correlation coefficients are then determined, by considering the correlation function in the following way:

$$correlation_{XY}(\tau) = \frac{1}{2}(B[|X(t)+Y(t-\tau)|^2] - B[|X(t)|^2] - B[|Y(t)|^2])$$

or $$correlation_{XY}(f) = \frac{1}{4}(E[|X(t)+Y(t-\tau)|^2] - E[|X(t)-Y(t-\tau)|^2])$$

This method makes it possible to obtain correlation coefficients directly from the signal $$correlation_{XY}(\tau) = \lim_{T\to\infty}\frac{1}{2T}\int_{-\tau}^{+\tau} X(t)Y^*(t-\tau)\,dt$$

In practice, the integral is calculated over a finite time interval that corresponds to the integration time.

A person skilled in the art will know to adapt the formulas to the cases of periodic signals, uncentred or not verifying all of the statistical properties cited above.

The normalised correlation function between the two signals is defined as follows:

$$C_{XY}(\tau) = \frac{correlation_{XY}(\tau)}{\sqrt{correlation_{XX}(0)}\sqrt{correlation_{YY}(0)}}$$

The use of normalised correlation coefficients makes it possible to detect a target without being concerned about the differences in levels between X and Y.

Because the correlation function moves toward zero when $\tau$ moves toward infinity, it is considered in practice that the time shift 96 is bounded. For example, if $\tau$ is between the time interval [$-\tau$ max, $\tau$ max], then there is a value $\tau_0$ of $\tau$ for which the normalised correlation function reaches its maximum $C_{XY}$, the maximum correlation function between the two linear sub-antennas.

$$C_{XY}=|C_{XY}(\tau=\tau_0)|=\max_{[-\tau_{max},\tau_{max}]}(|C_{XY}(\tau)|)$$

strengths by simply performing addition or subtraction operations.

In addition, it is possible to consider excluding signals that are too weak from the detection. Thus, it is possible to first calculate the denominator of the normalised correlation function mentioned above, and to compare it with a minimum threshold. When the denominator of the normalised correlation function is smaller than the minimum threshold, the corresponding correlation coefficient is not taken into account for the detection, which amounts to giving it a zero value. It is also possible to significantly reduce the integration time necessary for similar performances. Alternatively, it is also possible to compare each threshold of the denominator to a respective threshold.

To ensure an optimal result, it is desirable for the acquisition of the signals used for the correlation calculation to be synchronous.

Although a correlation calculation solution has been described in the time domain, it is also possible to consider calculating correlation coefficients in the frequency domain, for example for an application in a sonar. The correlation coefficients in the frequency domain can be determined from the coherence function defined as follows.

The Fourier transforms of the correlation functions of two signals X and Y defined above are inter-spectral densities (or interaction spectral densities).

$$\text{Fourier transform }(correlation_{XY})(f)=S_{XY}(f)$$

Similarly, the Fourier transforms of the correlation functions of signals X and Y defined above are power spectral densities of signals X and Y.

$$\text{Fourier transform }(correlation_{XX})(f)=S_{XX}(f)$$

$$\text{Fourier transform }(correlation_{YY})(f)=S_{YY}(f)$$

The coherence function between X and Y is defined by:

$$c_{XY}(f) = coherence_{XY}(f) = \frac{S_{XY}(f)}{\sqrt{S_{XX}(f)}\sqrt{S_{YY}(f)}}$$

The calculation of the coherence coefficients is generalised for all frequency bands of analysis $B_f$. In this case, the calculation of the coherence function becomes:

$$c_{XY}(f) = coherence_{XY}(B_f) = \frac{\int_{B_f} S_{XY}(f)\,df}{\sqrt{\int_{B_f} S_{XX}(f)\,df}\sqrt{\int_{B_f} S_{YY}(f)\,df}}$$

It is possible for the antenna processing devices 4 and 5 to weigh the basic signals of the sensors according to differences in directivity or sensitivity, before performing the combination (for example, linear) of these signals.

The antenna processing devices can also include an adaptive processing, which is intended to eliminate a parasitic signal, such as that coming from a jammer or any other processing enabling the functionalities and performances of the antenna and the associated data processing to be improved.

The signal processing devices 6 and 7 for the combined signals can perform: bandpass filtering, Doppler or MTI filtering, pulse compression processing operations or angle-error measurements or any other processing operation enabling the functionalities and performances of the antenna and the associated data processing to be improved.

Although not shown, it is possible for the antenna to include suitable data processing stages, providing the appropriate information to the operators. In general, the calculation of the correlation coefficients will preferably be performed after an antenna processing step and a signal processing step. The calculation of the correlation coefficients will generally be followed by a thresholding and information processing step.

The information processing stages, corresponding to the devices 8 to 10 in FIG. 1, are intended, for example, to detect, locate or display the presence of a source or target.

In the case of discrete signals, the calculation of the correlation coefficients can be performed on a number N of useful combined signal samples. A person skilled in the art will determine the number of samples necessary according to the desired probabilities of detection and false alarms.

For example, in the time domain, N time samples of complex signals X and Y are considered, and it is hypothesised that the maximum $C_{XY}$ is reached for $\tau_0=0$.

$$C_{XY} = \frac{\left|\sum_{t=1}^{N} X(t)\cdot Y^*(t)\right|}{\sqrt{\sum_{t=1}^{N} |X(t)|^2}\cdot\sqrt{\sum_{t=1}^{N} |Y(t)|^2}}$$

If the signals that are too weak are eliminated by performing a test on the denominator as described above, then the number of samples N can be significantly reduced for similar performances with regard to the probability of false alarms and detection.

Comparative trials and studies have been performed. The antenna according to the invention has two perpendicular straight line portions each consisting of 25 modules, i.e. a total of 50 modules. The reference antenna has an array of 100 modules distributed over a square surface. The antennas have been compared in studies according to three types of target known to a person skilled in the art: a nonfluctuating target, a slowly fluctuating target and a rapidly fluctuating target. For the trials, the transmitter used includes a synthesiser transmitting a signal at 9,345 GHz, cut into pulses by a switch. The antenna channels were transposed in frequency and numbered at a sampling frequency of 1 MHz. The detection capabilities of the antennas were tested according the signal-to-noise ratio by pointing the antennas in the direction of the transmitter. The capabilities of the antennas for rejecting targets outside of the detection lobe were also tested by mispointing the antenna in bearing. The influence of a jammer (significant background noise generator) near the transmitter was also tested. The jammer was simulated by a frequency modulation of the synthesiser.

All other things being equal, the two antennas obtain the same probability of detection when the number of samples N of the antenna of the invention with the denominator test method is 4 times greater than that of the reference antenna, for a nonfluctuating or slowly fluctuating target; for a rapidly fluctuating target, the antenna of the invention with the denominator test method obtains a better probability of detection when the number of samples N is 4 times greater than that of the reference antenna. This improvement i the performance of the antenna of the invention with the denominator test method can be demonstrated with by the signal-to-noise ratio necessary for obtaining a detection probability of 0.9 when the false alarm probability is $10^{-4}$, 6 dB lower than that of the reference antenna.

In addition, for a number of modules reduced by half, the antenna of the invention makes it possible to achieve the same performance with respect to the probability of detection and the probability of false alarms as for the reference antenna. It is also understood that this performance of the antenna of the invention would be substantially better than that of a reference antenna having the same number of modules, on the condition that the level of the secondary lobes is sufficiently reduced with respect to that of the main lobe.

Theoretically, the calculation of correlation coefficients is comparable to a non-coherent integration, which is distinguished from the coherent integrations normally performed on antennas. The non-coherent detection can be extended over a longer time than the coherent integration. The secondary lobes associated with the antenna processing of the invention are thus randomly distributed over the perpendicular plane of the central lobe (in the example, the elevation angle-bearing plane) and not deterministically. It is therefore noted, as shown in FIGS. 2 to 4, that the antenna does not lock on to a target on the secondary lobes.

The antenna of the invention also has a resolution 2.5 times superior to that of the reference antenna, due to the greater length of the line portions with respect to the sides of the square of the reference antenna.

The method for testing the denominator of the correlation coefficient has made it possible in practice to reduce the necessary number of samples for a given performance level by 3.

Figure 2:
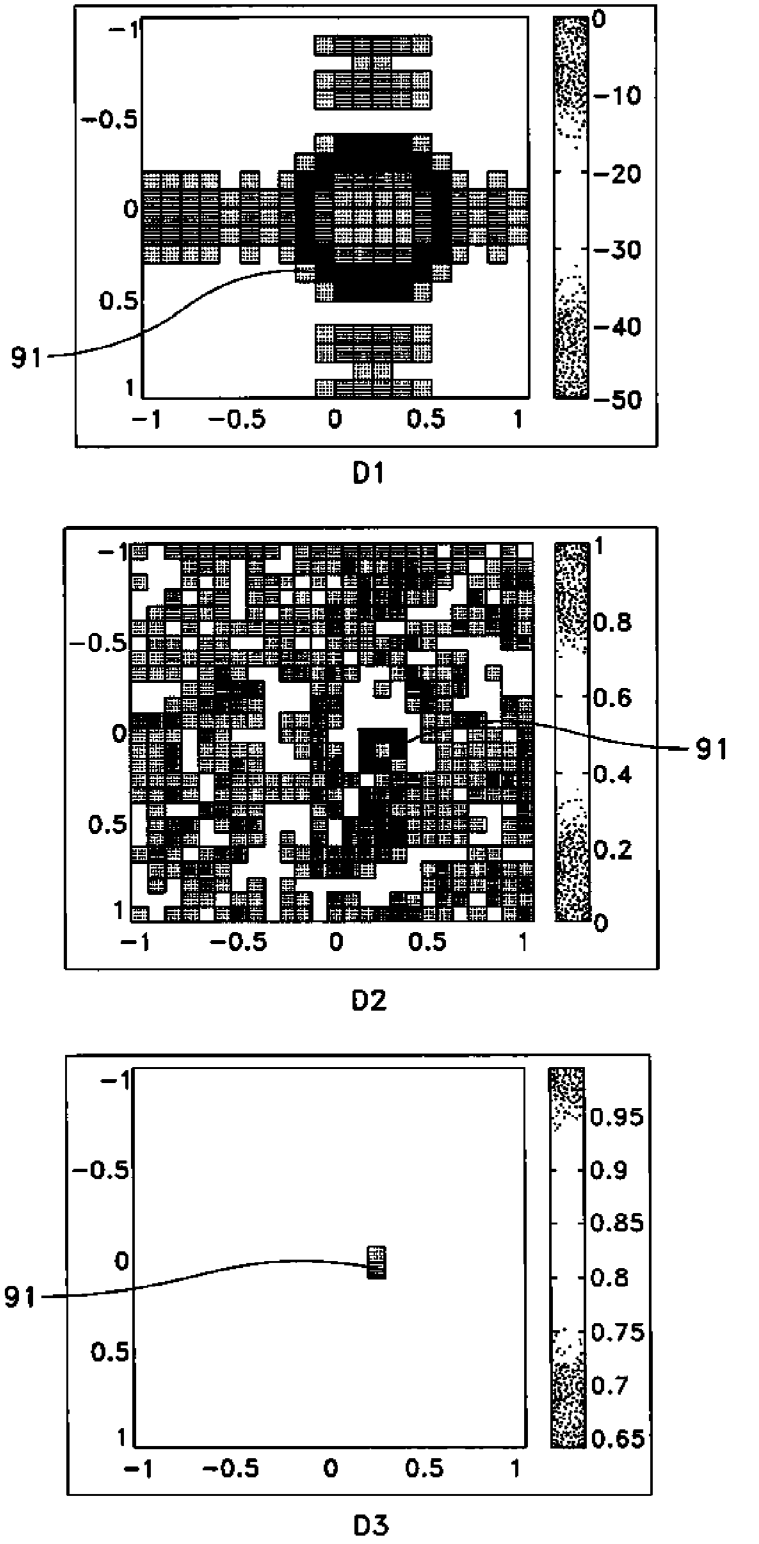
FIGS. 2 to 4, diagrams comparing the source location for different cases.
Figure 3:
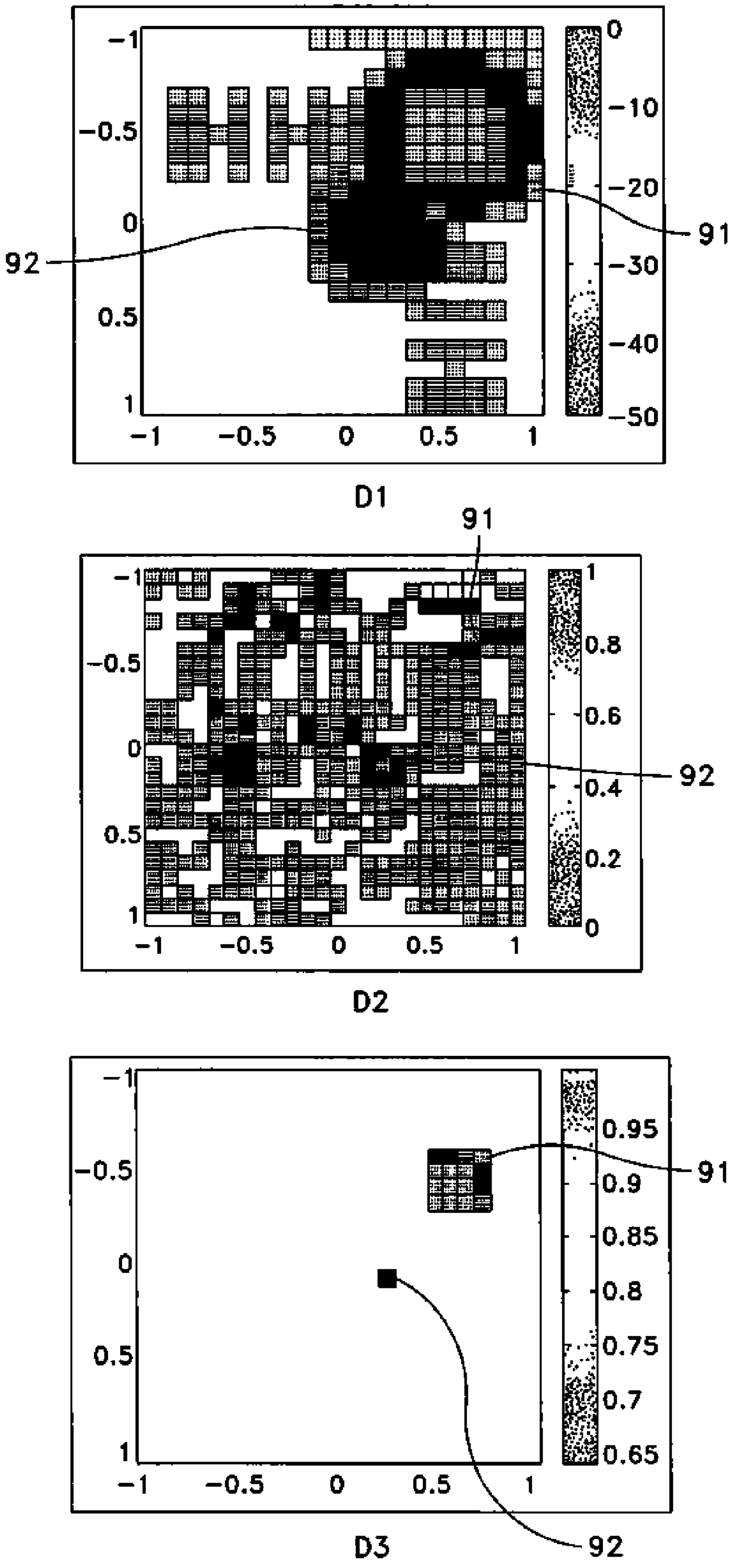
Figure 4:
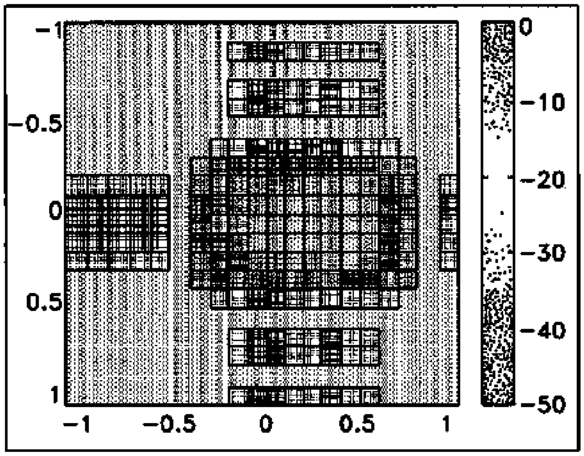
Figure 4:
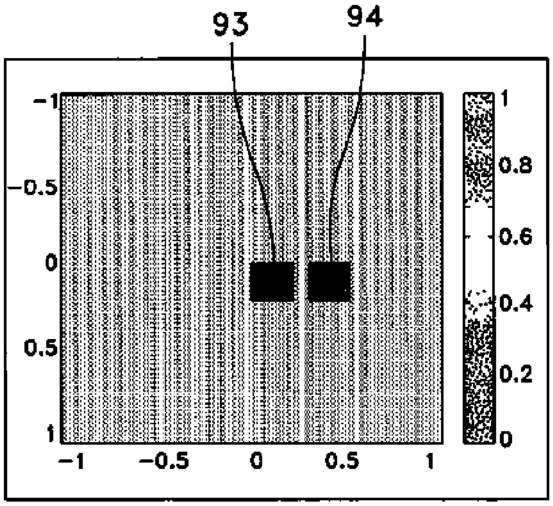
Figure 4:
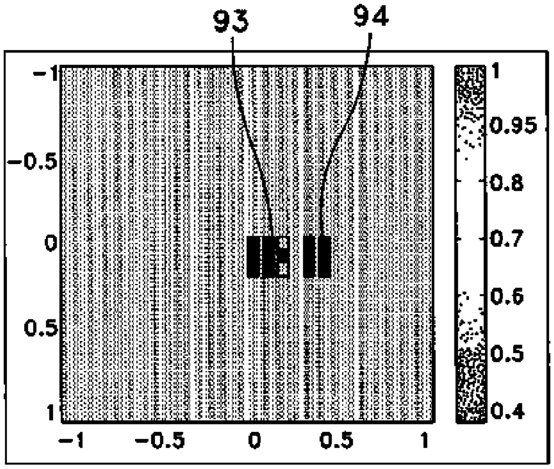

FIGS. 2 to 4 show the detection diagram D1 of a conventional antenna, compared with the diagrams D2 and D3 of a cross antenna, in different cases. D1 corresponds to the diagram generated by the reference antenna, D2 to the diagram generated by the antenna according to the invention, and D3 is the diagram obtained from D2 after thresholding.

FIG. 2 identifies the location performance in the presence of a single target. It is noted that diagrams D2 and D3 have a very clear trace around the target 91 detected. By contrast, the secondary lobes of the conventional antenna give an unclear contour of the target 91 in diagram D1.

FIG. 3 identifies the location performance in the presence of a single target and a jammer in the vicinity. It is noted in diagrams D2 and D3 that the target 91 and the jammer 92 are properly located. It is also noted that the trace of the target and the jammer are much clearer in D2 and D3 than in D1.

FIG. 4 identifies the location performance in the presence of two targets 93 and 94. It is noted that D2 and D3 have a superior resolution to that of D1. D2 and D3 enable the two targets 93 and 94 to be distinguished, unlike in D1.

In order for the presence of a jammer in the same location as the target not to reduce the location performance of the antenna, the latter can perform the following steps, locate the jammer and point to it, measure the signal coming from the jammer, subtract this signal from signals subsequently measured by the modules. The tilt of the linear sub-antennas, for example by 45° with respect to their initial axis, also makes it possible to reduce the influence of a jammer on the measurements.

Although the invention appears to be particularly advantageous for radar sensors, it can of course be applied to antennas of which the elementary sensors are hydrophones, microphones, transducers, radioelectric sensors, electromagnetic sensors, ultrasound sensors, accelerometers, or optical or infrared sensors.

For example, it is possible to use the invention in the aeronautical field for detecting obstacles or objects, or for providing an image thereof.

It is also possible to use the invention in the submarine field for detecting obstacles or submarine objects, or for providing an image thereof.

It is also possible to use the invention in the astronomical field for detecting, or even providing an image of, celestial objects close to the earth such as satellites or ballistic missiles, or very far, such as stars.

It is also possible to use the invention in the field of space for detecting, from the sky, or even providing an image of, objects close to the earth, such as flying objects, or on the earth, such as stationary or mobile objects.

It is also possible to use the invention in the seismological field for detecting, or even providing an image of, solid, liquid or gaseous objects embedded in or under the earth's surface.

It is also possible to use the invention in the medical field in order to detect, or even provide an image of, living beings or solid, liquid or gaseous objects located inside the human body.

The invention can be used, for example, in the field of security, for example, on the ground, for detecting, or even providing an image of, intrusions in a protected space.

It is also possible to use the invention in the maritime field for detecting, or even providing an image of, surface vessels.

The invention can be used, for example, in the field of aeronautical security for detecting, or even providing an image of, aircraft navigating around a sensitive zone, such as, for example, airports, nuclear centres and protected buildings.

The invention can be used, for example, in the field of ground navigation (for example, automobile), naval navigation (for example, boat), submarine navigation (for example submarine), or aeronautical navigation (for example, airliner) for detecting, or even providing an image of, non-visible obstacles, and thus improve their security.

The invention can be used, for example, in the field of earth-space or submarine communications, in order to increase the number of communication channels and enhance the reception thereof.

The invention can be used, for example, in the field of electronic warfare, in order to improve detection performance.

The invention can be used, for example, in the field of homing devices for missiles or torpedoes, in order to improve navigation performance.

The invention can be used, for example, in the field of acoustics, in order to improve the performance of microphones.

The invention can be used, for example, in the field of robotics, in order to detect, or even provide an image of, objects or obstacles located in the vicinity of the robot.

The invention can be used, for example, in the field of non-destructive testing, in order to improve the performance of ultrasound probes.

The invention claimed is:

1. An antenna comprising:

a first and a second linear sub-antenna:

each having a plurality of sensors arranged so as to form first and second line portions, respectively, with each sensor generating a basic signal;

wherein the angle between respective directional vectors of the first and second tangents to the midpoint respectively of the first and second line portions is between 30° and 150°;

an antenna processing device forming a plurality of combined signals for each line portion, which signal is a combination of basic signals from the sensors of this line portion;

a signal processing device generating useful combined signals by filtering the noise of the combined signals coming from each line portion;

a device for calculating normalized correlation coefficients between the useful combined signals of the first line portion and the useful combined signals of the second line portion;

a device generating a detection signal when a normalised correlation coefficient exceeds a detection threshold.

2. The antenna according to claim 1, further comprising a target detection device, comparing each calculated normalised correlation coefficient with an associated target detection threshold, detecting and locating a target when a correlation coefficient exceeds said associated target detection threshold.

3. The antenna according to claim 2, further comprising a processing device for processing the detection signal and the correlation coefficients generating information concerning the detected target.

4. The antenna according to claim 3, wherein the information generated includes the distance, the elevation angle, the bearing and the speed of the target.

5. The antenna according to claim 3, further comprising a device displaying the information generated.

6. The antenna according to claim 1, wherein each sensor includes a plurality of elementary sensors selected from the group consisting of radar, radioelectric and electromagnetic sensors, hydrophones, transducers, microphones, ultrasound sensors, accelerometers, and optical and :infrared sensors.

7. The antenna according to claim 6, wherein:

the elementary sensors are transmissive;

the data processing device processes the combined signals according to the signal transmitted by each sensor, wherein processing includes, pulse compression.

8. The antenna according to claim 6, further comprising a transmitter, wherein the data processing device processes the combined signals according to the signal transmitted by the transmitter, wherein processing includes pulse compression.

9. The antenna according to claim 1, wherein the first and second line portions are curves without an inflection point.

10. The antenna according to claim 1, wherein the first and second line portions are straight and oriented respectively in elevation angle and bearing.

11. The antenna according to claim 10, wherein the straight line portions are not parallel.

12. The antenna according to claim 4, further comprising a device displaying the information generated.

13. The antenna according to claim 5, wherein each sensor includes a plurality of elementary sensors selected from the group consisting of radar, radioelectric and electromagnetic sensors, hydrophones, transducers, microphones, ultrasound sensors, accelerometers, and optical and :infrared sensors.

* * * * *